Figure 1:
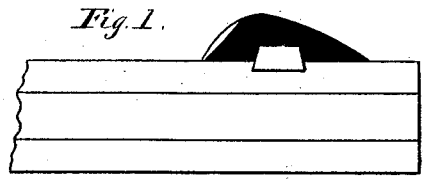

F. W. FREUND.
FRONT SIGHTS FOR FIRE-ARMS.

No. 189,721. Patented April 17, 1877.

WITNESSES  
Hugo C. Buechner.  
L. C. Stevens.

INVENTOR  
Frank Wm Freund.

UNITED STATES PATENT OFFICE.

FRANK W. FREUND, OF CHEYENNE, WYOMING TERRITORY.

IMPROVEMENT IN FRONT SIGHTS FOR FIRE-ARMS.

Specification forming part of Letters Patent No. 189,721, dated April 17, 1877; application filed April 7, 1876.

*To all whom it may concern:*

Be it known that I, FRANK W. FREUND, of the city of Cheyenne, in the county of Laramie and Territory of Wyoming, have invented a new and useful Improvement in Front Sights for Fire-Arms, of which the following specification, taken in connection with the drawing, which forms part of the same, is a full and complete description.

The object of my invention is to produce a front sight for fire-arms which shall be equally as efficient in dark and cloudy as in fine weather, and for aiming at dark as well as light objects; and to this end it consists in making the rear face of the sight, or that nearest to the eye in aiming, of two contrasting colors, preferably black and white, or as near these colors as may be, combined in such a manner that the body of the sight shall present one color, bounded on the top, side, or edge with a line of the opposite color.

It is well known among marksmen, and especially among hunters, that in aiming at a dark object on a dark, cloudy day, it is often difficult, with the ordinary sight, to take accurate aim, on account of a sameness in color between the sight and the object aimed at, and the consequent difficulty in distinguishing when the sight is on the object, while a sight composed entirely of white substance presents the same difficulty when aiming at a light object, thus making it necessary for the marksman or hunter to provide himself with interchangeable sights in order to overcome these difficulties.

Now, I have discovered that by combining both a dark and a light colored sight in one, in the manner to be hereinafter more fully indicated, I produce a sight that is equally as efficient for aiming at light as well as dark objects under any of the conditions above referred to.

The particular character of my invention will be fully understood by a description thereof, when applied to the ordinary "pin sight," and I will therefore proceed to describe such a sight.

Ordinarily, it may be preferable to make the body of the sight of dark substance—as of steel or iron, blued in the usual and well-known manner, or of any other suitable material— and face the same on the side or edge nearest the eye with a line of white or light colored substance, of less width than the body of the sight, so as to leave a line of the dark substance of which the sight is made exposed to the eye in aiming.

Instead of facing the dark body of the sight with a light-colored substance, I may, when the body of the sight is made of iron or steel, effect the same object by making the rear portion of the sight wedge-shaped—that is, reduce it in thickness—and then polish or burnish the edge to make it bright.

In using a sight constructed in this manner, if the object aimed at be dark, the dark portion of the sight will be practically indistinguishable; but the white or light part will form a contrast in color with such object, and will permit quick and accurate aim to be taken, by enabling the marksman to distinguish readily when the sight is on the object aimed at; while if the object be light, the dark portion of the sight will form the contrast in color, and afford equal facility for accurate aiming, as in the case above.

I am aware that front sights have heretofore been made in which the rear face was made of white or bright-colored material, for the purpose of rendering them visible in the dark; but such sights are not adapted for the use for which my sight is intended, and I do not, therefore, claim such a sight; but it is obvious that the same principle will prevail if the arrangement of colors as above described be reversed—that is, if the body of the sight be made of white or light-colored substance, with a dark line placed thereon.

In this description I have described the invention as applied to the common pin-sight; but I desire to have it understood that I do not limit its application to such a sight, but intend to apply it to all shapes and styles of front sights.

Figure 2:
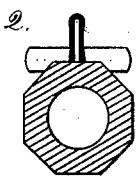
Figure 3:
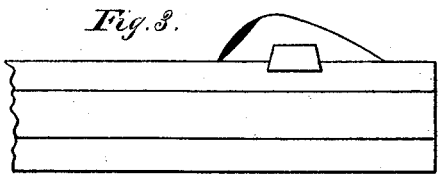
Figure 4:
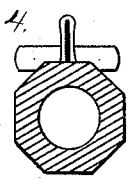
Figure 5:
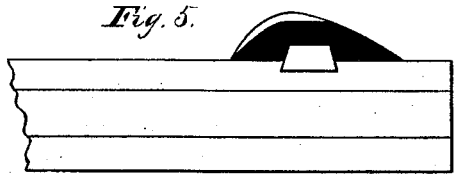
Figure 6:
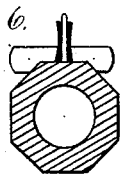
Figure 7:
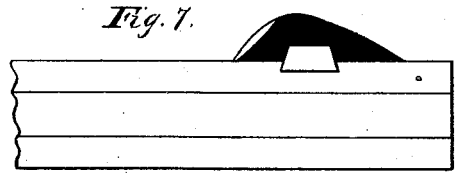
Figure 8:
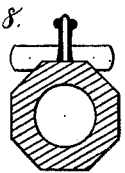
Figure 13:
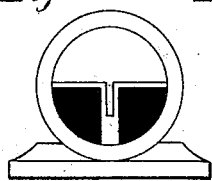
Figure 9:
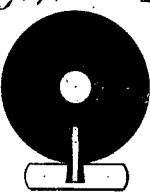
Figure 15:
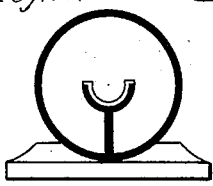
Figure 10:
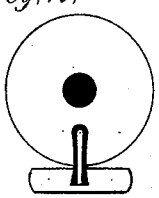
Figure 17:
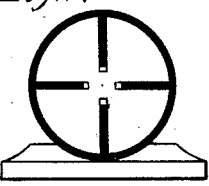
Figure 14:
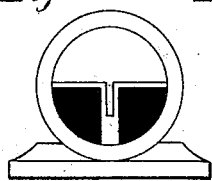
Figure 11:
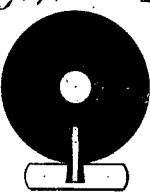
Figure 16:
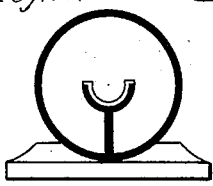
Figure 12:
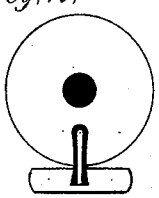
Figure 18:
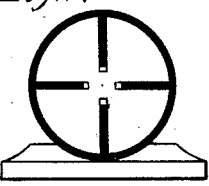

Referring now more particularly to the drawing, Figures 1 and 2 are, respectively, front and side views of a sight with white center line and dark outside. Figs. 3 and 4 are similar views of a sight with dark center line and light outside. Figs. 5 to 8 are views of different-shaped sights. Figs. 9 and 10 show, respectively, the appearance of the sight shown in Figs. 1 and 2 when aiming at dark and light objects, and Figs. 11 and 12 show the appearance of the sight shown in Figs. 3 and 4 when aiming at similar objects. Figs. 13 to 18 illustrate sights of different shapes and styles with my invention applied thereto.

Having thus described my invention, what I desire to claim as new, and to secure by Letters Patent of the United States, is—

1. A front sight for fire-arms, in which the rear face, or that portion nearest the eye in aiming, presents two contrasting colors, one of which forms a vertical line between two lines of the other color, as and for the purpose described.

2. A front sight for fire-arms in which the rear face, or that portion nearest the eye in aiming, presents a center line of white or light-colored substance, with a dark line on either side, substantially as and for the purpose set forth.

FRANK WM. FREUND.

Witnesses:
 PHILIP ZEHNER,
 L. C. STEVENS.